United States Patent
Brown, Sr.

(10) Patent No.: US 10,264,775 B2
(45) Date of Patent: Apr. 23, 2019

(54) QUICK-ATTACH SLIDING FISHING WEIGHT

(71) Applicant: Bruce B. Brown, Sr., New Preston, CT (US)

(72) Inventor: Bruce B. Brown, Sr., New Preston, CT (US)

(*) Notice: Subject to any disclaimer, the term of this patent is extended or adjusted under 35 U.S.C. 154(b) by 252 days.

(21) Appl. No.: 15/449,244

(22) Filed: Mar. 3, 2017

(65) Prior Publication Data

US 2018/0064084 A1 Mar. 8, 2018

Related U.S. Application Data

(60) Provisional application No. 62/384,295, filed on Sep. 7, 2016.

(51) Int. Cl.
*A01K 95/02* (2006.01)
(52) U.S. Cl.
CPC .................................. *A01K 95/02* (2013.01)
(58) Field of Classification Search
CPC ................................ A01K 95/02; A01K 95/00
See application file for complete search history.

(56) References Cited

U.S. PATENT DOCUMENTS

| | | | | |
|---|---|---|---|---|
| 3,091,050 A * | 5/1963 | Metzler | A01K 95/00 43/44.88 |
| 4,472,903 A * | 9/1984 | Hutson | A01K 95/00 43/44.91 |
| 4,691,468 A * | 9/1987 | Fernbach | A01K 95/02 43/44.9 |
| 5,241,774 A * | 9/1993 | Rayburn | A01K 93/00 43/44.9 |
| 5,305,534 A * | 4/1994 | Lazich | A01K 95/02 43/44.91 |
| 7,162,830 B2 * | 1/2007 | Sims | A01K 91/03 43/44.87 |
| 9,265,240 B2 * | 2/2016 | Kavanaugh | A01K 91/03 |
| 2008/0295386 A1 * | 12/2008 | Hudson | A01K 95/02 43/44.91 |
| 2009/0188151 A1 * | 7/2009 | Bartholomew | A01K 93/00 43/44.91 |
| 2009/0293338 A1 * | 12/2009 | Lu | A01K 75/06 43/9.8 |
| 2014/0237891 A1 * | 8/2014 | Donahoe | A01K 95/02 43/44.87 |
| 2015/0128473 A1 * | 5/2015 | Kim | A01K 85/00 43/17.5 |
| 2016/0302401 A1 * | 10/2016 | Grundy | A01K 95/02 |
| 2017/0006846 A1 * | 1/2017 | Nitta | A01K 91/18 |
| 2017/0071179 A1 * | 3/2017 | Jamil | A01K 95/00 |

FOREIGN PATENT DOCUMENTS

CA    2516869 A1 *  3/2006  ............. A01K 91/03

OTHER PUBLICATIONS

Website: (http://www.basspro.com/Sea-Striker-QuikSlide-Sinker-Slides/product/97147/#print) Sea Striker Quik-Slide Sinker Slides; download date: Jun. 26, 2017; 4 pps.

* cited by examiner

*Primary Examiner* — Christopher P Ellis
(74) *Attorney, Agent, or Firm* — Carson C. K. Fincham; Fincham Downs LLC

(57) ABSTRACT

Systems, methods, and articles of manufacture for quick-attach sliding fishing weights or sinkers are provided.

8 Claims, 7 Drawing Sheets

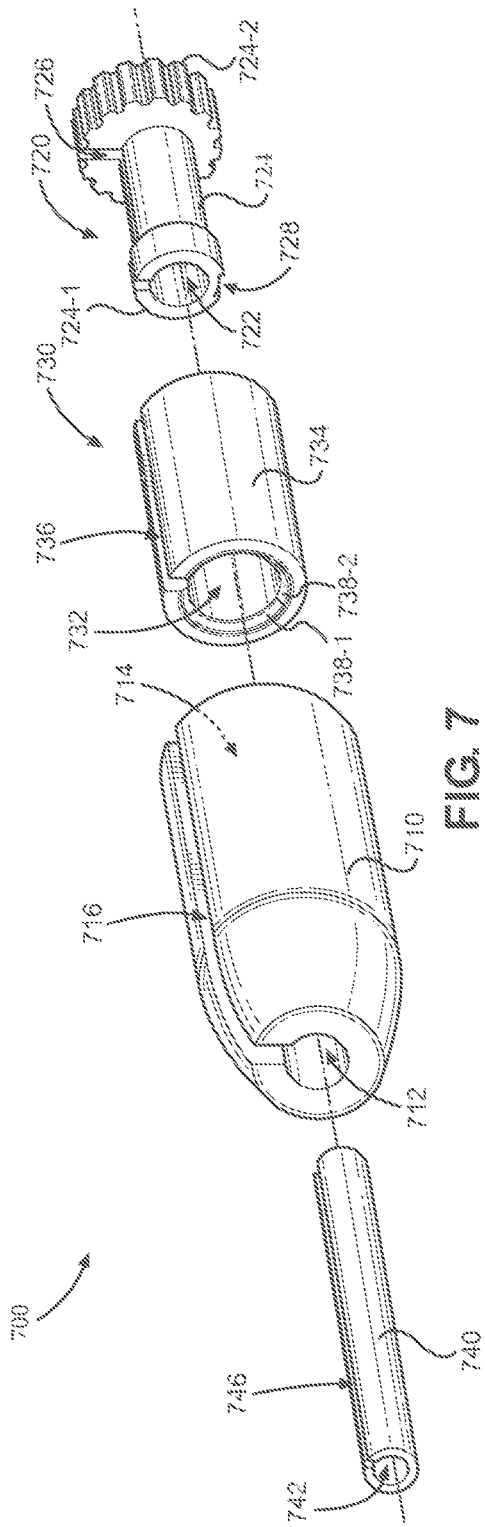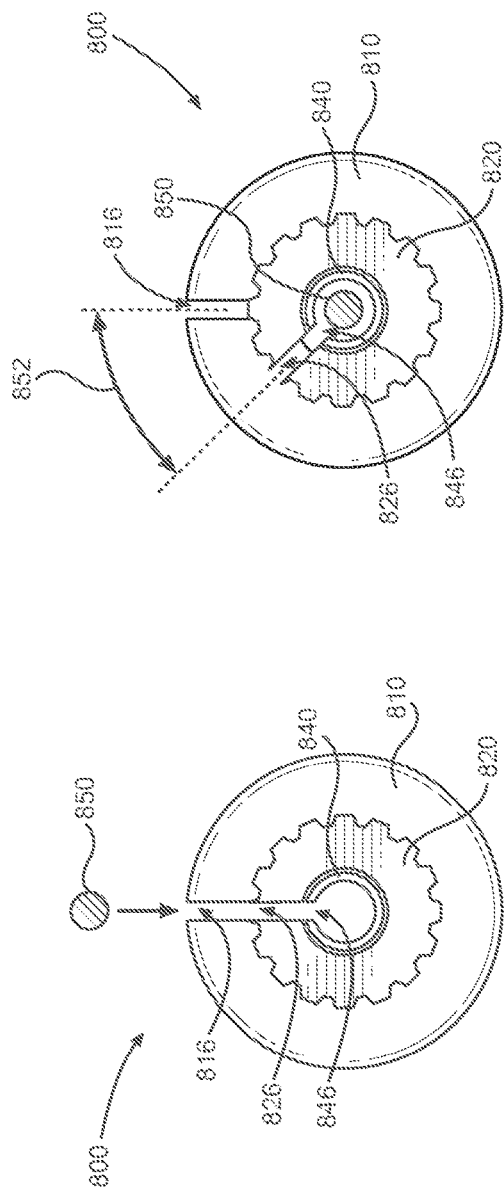

QUICK-ATTACH SLIDING FISHING WEIGHT

CROSS-REFERENCE TO RELATED APPLICATIONS

The present application is a non-provisional of, and claims benefit and priority under 35 U.S.C. § 119(e) to U.S. Provisional Patent Application No. 62/384,295 filed on Sep. 7, 2016 and titled "Quick Change Sliding Weights", the entirety of which is hereby incorporated by reference herein.

BACKGROUND

Fishing weights or "sinkers" are available in a variety of shapes and sizes (e.g., weighing different amounts) and are increasingly available in a variety of materials. While lead (Pb) has been the predominant fishing weight material for many years due to ease of use and affordability, for example, due to increasing concerns regarding environmental impacts of lead weights in aquatic ecosystems, tungsten (W), brass (Cu+Zn), steel (e.g., Fe+C), and bismuth (Bi) weights/sinkers are now widely available.

Fishing weights are also offered in a variety of configurations that permit different mechanisms to attach the weights to fishing equipment (e.g., a fishing rigs, line, leaders, etc.). Typically, standard fishing weights are equipped with an eye through which fishing line may be passed to tie on to the weight. Some weights are designed to be crimped onto a fishing line (split-shot style sinkers) and others are designed to allow the fishing line to be engaged with multiple elements of the weight (e.g., rubber core sinkers comprise an axial groove through which line is inserted and a rubber tab or "ear" at each end around which the line is wound, securing the weight to the line). Sliding fishing weights/sinkers comprise a hole or axial passage through which fishing line is passed, allowing the weight to travel up and down the line. Each of these attachment mechanisms, however, lacks convenience of use and is prone to various points of failure.

BRIEF DESCRIPTION OF THE DRAWINGS

An understanding of embodiments described herein and many of the attendant advantages thereof may be readily obtained by reference to the following detailed description when considered with the accompanying drawings, wherein:

FIG. 7 is a perspective assembly diagram of a quick-attach sliding fishing weight system according to some embodiments; and FIG. 8A and FIG. 8B are rear views of a quick-attach sliding fishing weight system according to some embodiments.

DETAILED DESCRIPTION

I. Introduction

Figure 1A:
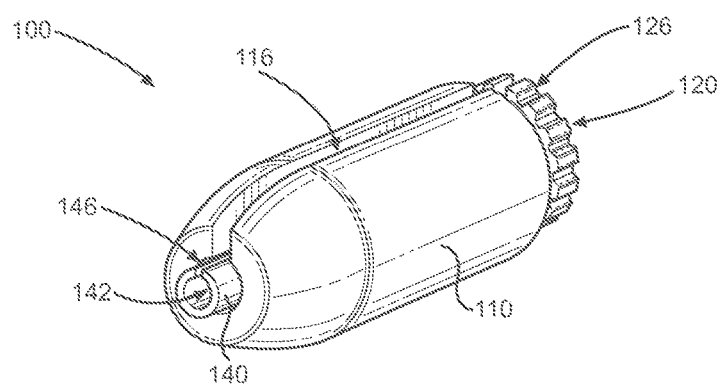
FIG. 1A, FIG. 1B, FIG. 1C, FIG. 1D, FIG. 1E, FIG. 1F, and FIG. 1G are perspective, front, back, left side, right side, top, and bottom views of a quick-attach sliding fishing weight according to some embodiments.

Embodiments presented herein are descriptive of systems, apparatus, methods, and articles of manufacture for quick-attach sliding fishing weights. In some embodiments, a sliding fishing weight or sinker body may comprise an axial groove or slit and an interior volume housing a selectively indexable rotating quick-attach mechanism. According to some embodiments, a slotted pin or insert may be housed within the selectively indexable rotating quick-attach mechanism. In such a manner, for example, a sliding fishing weight may be quickly and easily attached to or detached from a fishing line, without requiring line cutting, knot tying, or other timely and/or complicated modifications to fishing rigs, lures, leaders, and/or tackle (e.g., "terminal tackle").

Typical fishing equipment setups include, for example, one or more fishing weights such as a sliding weight/sinker coupled to slide up and down a length of fishing line. Sliding sinkers are often disposed on the line between (or at) a swivel (e.g., a snap swivel) and a fishing lure (artificial and/or live). To accommodate different tide, current, and/or bottom conditions however, such sinkers may often need to be changed out for a sinker of a different weight (e.g., heavier or lighter, as may be desirable). While changing any fishing weight/sinker is often burdensome and time consuming, change-out of sliding weights is particularly onerous due to the fishing line being threaded through the body of the weight, wherein removal of the weight requires at least one end of the line to be free to pass back out of the sliding weight. This requires, for example, the line to be cut or untied from one or more tackle elements disposed on either side of the sliding weight.

Many fisherman, in an attempt to mitigate this problem, stock multiple rigs or leaders in their tackle boxes, each leader being outfitted with a sliding sinker of a different weight. Leaders may then be changed out relatively simply by engaging or disengaging a snap swivel or other selectively engageable line element coupled to the rig. Swapping leaders having different installed weights, however, requires both the purchase of additional fishing tackle and the change-over of the lure being employed. In the case live bait is utilized, for example, the live bait must be transferred from the hook of the first leader to the second leader. Particularly in situations where fish are actively feeding (which can be fleeting moments that are few and far between), taking the time to swap leaders and bait, much less cutting and retying line on a single leader to install a new sliding sinker of a different weight, can be the difference between a successful catch and a disappointing experience (particularly for young anglers).

Some of these disadvantages have been alternatively mitigated by the user of "fish finders", which (with respect to terminal tackle) are quick-attach sliding elements having a radial arm and/or eye that is utilized to couple to a sinker.

Sinkers of different weights may be swapped out with relative ease by employing a quick snap element between the eye/arm and the sinker. As the fish finder itself slides freely on the line, multiple styles of sinker may be utilized by attaching to the arm/eye of the fish finder device. Fish finders are generally a replacement for a sliding weight, as attaching a sliding weight to the fish finder would generally require more work and equipment (e.g., an additional length of line with a terminal element) than attaching an eye of a standard weight to the fish finder.

Fish finders, however, also offer several disadvantages. Due to the radially-extending arm or eye, for example, the fish finder is more likely to encounter a "snag" when passing through rocks, weeds, or other underwater obstructions. Indeed, some fish finder devices are specifically designed to allow the sinker to break away from the device in the case the sinker catches a snag. Fish finder rigs also offer limited casting range due to the weight not being in-line with the main fishing line and/or lure/bait being cast. Casting of fish finder rigs that include a weight leader line may, for example, result in orbital motion of the weight around the main line which steals distance from the energy of the cast and/or may lead to a tangled line.

Embodiments for a quick-attach sliding fishing weight presented herein solve these and other deficiencies of previous fishing weight designs, making weight change-over quicker and easier while still allowing for the advantages of utilizing a sliding weight (e.g., on the main line). The quick-attach sliding fishing weights described herein may, for example, reduce the need for additional tackle (saving money and freeing up space in the tackle box), allow for more efficient sliding weight change-over, and/or reduce the likelihood of fishing weight failure (e.g., by reducing the need for line cutting, re-tying, and/or engagement of other fishing tackle elements).

II. Quick-Attach Sliding Fishing Weights

Figure 1B:
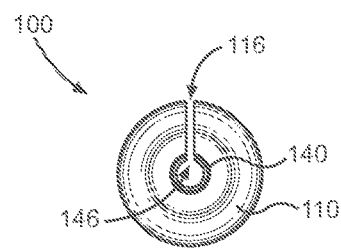
Figure 1C:
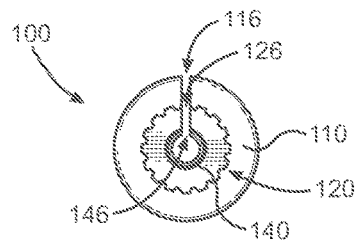
Figure 1D:
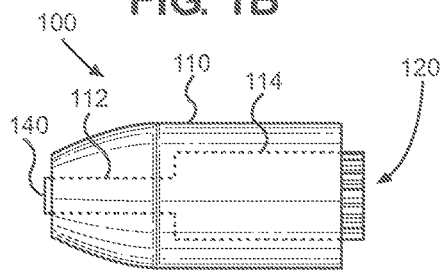
Figure 1E:
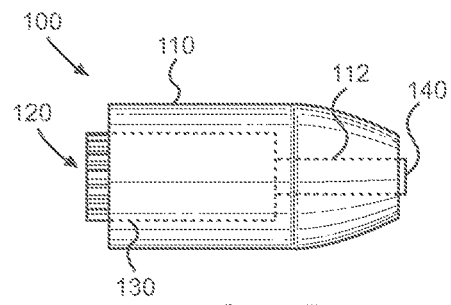
Figure 1F:
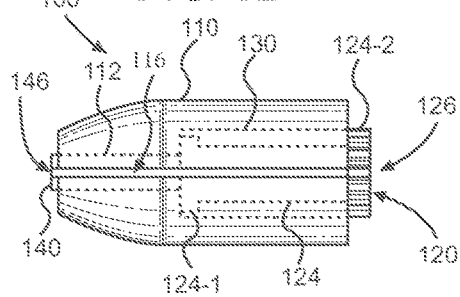
Figure 1G:
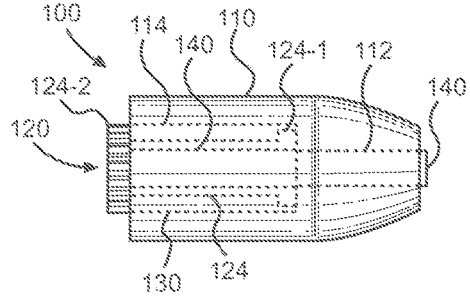
Figure 2A:
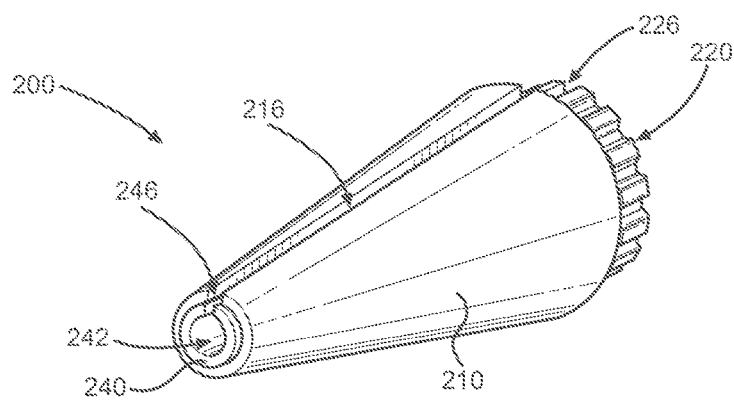
FIG. 2A, FIG. 2B, FIG. 2C, FIG. 2D, FIG. 2E, FIG. 2F, and FIG. 2G are perspective, front, back, left side, right side, top, and bottom views of a quick-attach sliding fishing weight according to some embodiments.
Figure 2B:
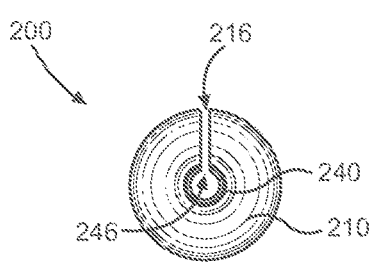
Figure 2C:
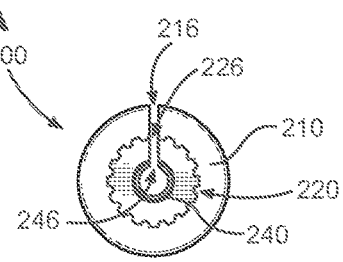
Figure 2D:
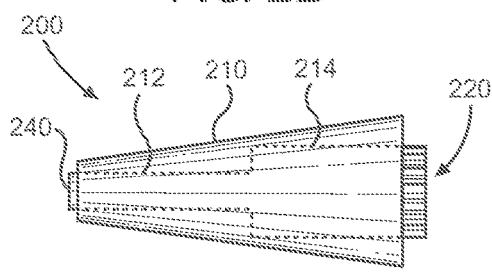
Figure 2E:
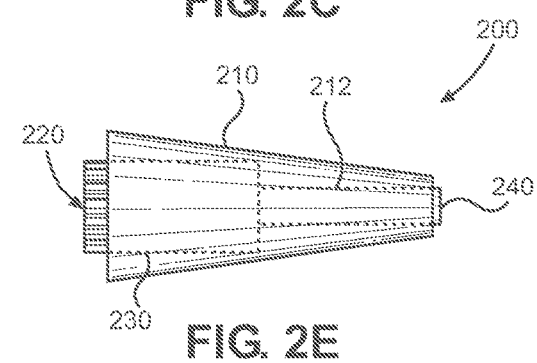
Figure 2F:
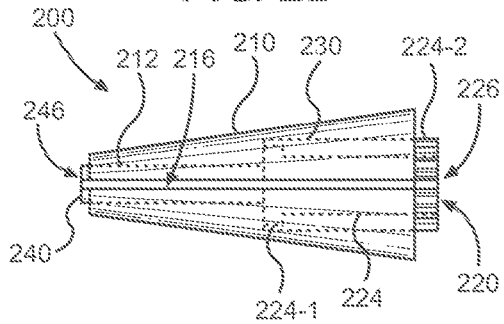
Figure 2G:
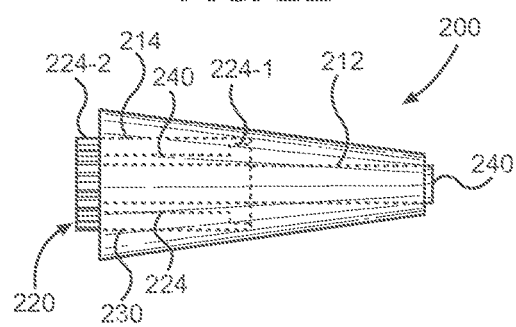
Figure 3A:
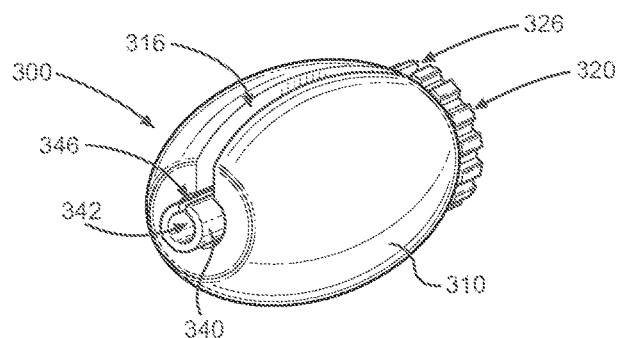
FIG. 3A, FIG. 3B, FIG. 3C, FIG. 3D, FIG. 3E, FIG. 3F, and FIG. 3G are perspective, front, back, left side, right side, top, and bottom views of a quick-attach sliding fishing weight according to some embodiments.
Figure 3B:
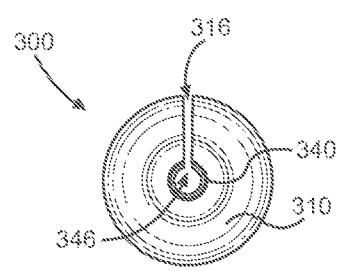
Figure 3C:
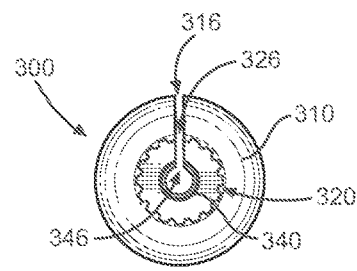
Figure 3D:
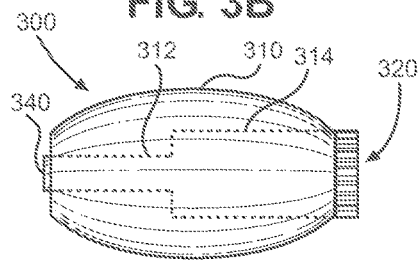
Figure 3E:
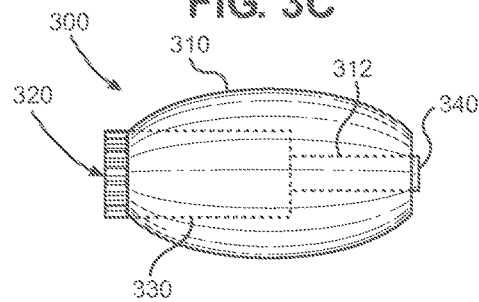
Figure 3F:
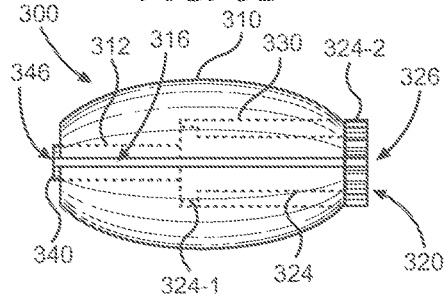
Figure 3G:
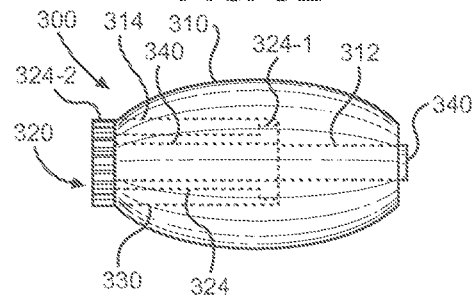
Figure 4A:
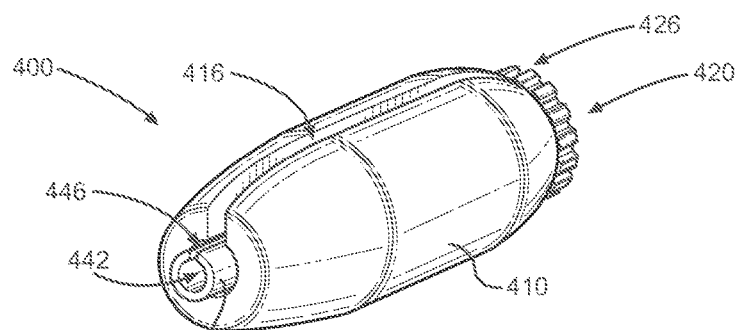
FIG. 4A, FIG. 4B, FIG. 4C, FIG. 4D, FIG. 4E, FIG. 4F, and FIG. 4G are perspective, front, back, left side, right side, top, and bottom views of a quick-attach sliding fishing weight according to some embodiments.
Figure 4B:
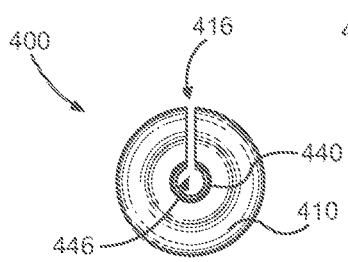
Figure 4C:
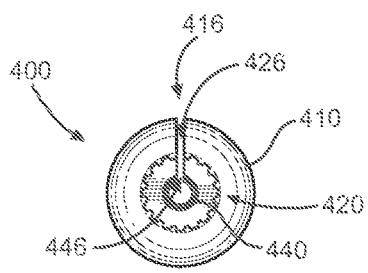
Figure 4D:
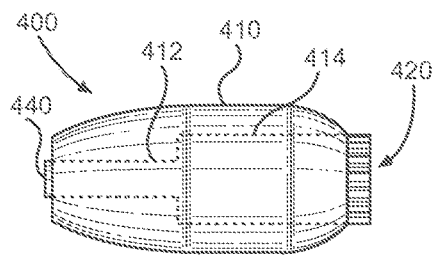
Figure 4E:
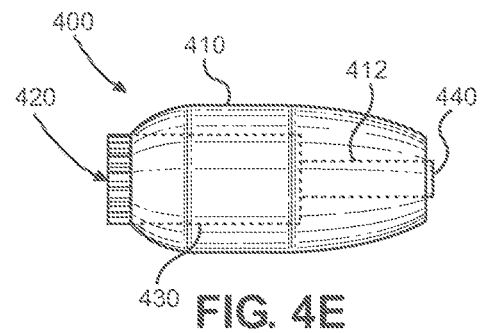
Figure 4F:
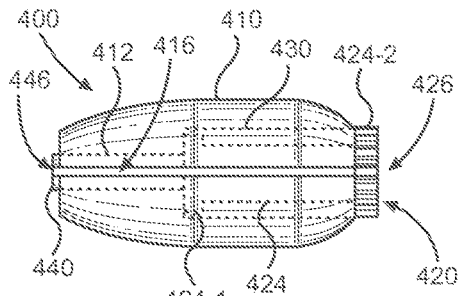
Figure 4G:
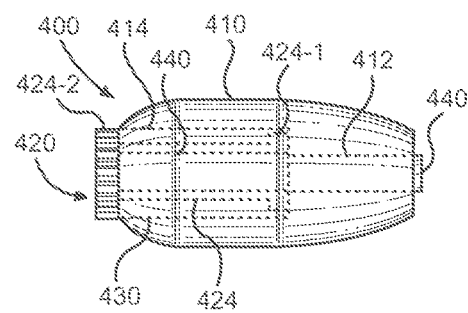

Turning initially to each of four (4) sets of figures, (i) FIG. 1A, FIG. 1B, FIG. 1C, FIG. 1D, FIG. 1E, FIG. 1F, and FIG. 1G, (ii) FIG. 2A, FIG. 2B, FIG. 2C, FIG. 2D, FIG. 2E, FIG. 2F, and FIG. 2G, (iii) FIG. 3A, FIG. 3B, FIG. 3C, FIG. 3D, FIG. 3E, FIG. 3F, and FIG. 3G, and (iv) FIG. 4A, FIG. 4B, FIG. 4C, FIG. 4D, FIG. 4E, FIG. 4F, and FIG. 4G, perspective, front, back, left side, right side, top, and bottom views of a quick-attach sliding fishing weight 100, 200, 300, 400 according to some embodiments are shown. The different sets of figures are shown for better explanation and description of how various shapes of quick-attach sliding fishing weights/sinkers may be provided in accordance with some embodiments. The first set of figures FIG. 1A, FIG. 1B, FIG. 1C, FIG. 1D, FIG. 1E, FIG. 1F, and FIG. 1G depict a "bullet"-shaped quick-attach sliding fishing weight 100, for example, while the second set of figures FIG. 2A, FIG. 2B, FIG. 2C, FIG. 2D, FIG. 2E, FIG. 2F, and FIG. 2G depict a cone-shaped quick-attach sliding fishing weight 200. The third set of figures FIG. 3A, FIG. 3B, FIG. 3C, FIG. 3D, FIG. 3E, FIG. 3F, and FIG. 3G depict an "egg"-style quick-attach sliding fishing weight 300 and the fourth set of figures FIG. 4A, FIG. 4B, FIG. 4C, FIG. 4D, FIG. 4E, FIG. 4F, and FIG. 4G depict a "hybrid"-style quick-attach sliding fishing weight 400. In the description that follows the various quick-attach sliding fishing weights 100, 200, 300, 400 of the different figure sets will be referred to collectively but in the singular, for ease of explanation. The left side, right side, top, and bottom views in the various figure sets are also provided in a specific manner to facilitate explanation of the internal components thereof, as depicted by the "ghost" or dotted lines in those respective views. In each left side view (FIG. 1D, FIG. 2D, FIG. 3D, and FIG. 4D), for example, only certain interior components are represented by dotted lines, while different and/or additional components are depicted in each right side view (FIG. 1E, FIG. 2E, FIG. 3E, and FIG. 4E), and each top view (FIG. 1F, FIG. 2F, FIG. 3F, and FIG. 4F). Each bottom view (FIG. 1G, FIG. 2G, FIG. 3G, and FIG. 4G) depicts the full complement of internal components of the quick-attach sliding fishing weights 100, 200, 300, 400.

In some embodiments, the quick-attach sliding fishing weight 100, 200, 300, 400 may comprise a sinker body 110, 210, 310, 410 that may generally, for example, be constructed of a metal material such as lead, steel, brass, tungsten, and/or bismuth. Other weighted materials that are or become known or practicable may be utilized without deviating from the scope of some embodiments herein. The purpose of the sinker body 110, 210, 310, 410 may generally comprise the same purpose of any fishing weight or sinker, i.e., adding weight to a fishing rig to accommodate for various underwater fishing conditions and situations (e.g., different species may be pursued at different fishing depths requiring different overall weight for the fishing rig). According to some embodiments, the sinker body 110, 210, 310, 410 may be generally disposed and/or elongated in a particular direction (e.g., as shown) such as along an axis (not separately shown). While some of the more conventional shapes of sliding fishing weights are depicted with respect to the sinker body 110, 210, 310, 410, any shape or configuration of sinker body 110, 210, 310, 410 that is or becomes known or practicable may be utilized without deviating from the scope of some embodiments. In some embodiments, the sinker body 110, 210, 310, 410 may comprise and/or define a first internal channel, hole, or bore 112, 212, 312, 412 (as shown in FIG. 1B, FIG. 2B, FIG. 3B, and FIG. 4B). The first internal bore 112, 212, 312, 412 may, for example, extend from one (e.g., a first or back) end of the sinker body 110, 210, 310, 410 to the other (e.g., second or front) end thereof. In some embodiments, the first internal bore 112, 212, 312, 412 may comprise a first diameter.

According to some embodiments, the sinker body 110, 210, 310, 410 may comprise and/or define a second internal channel, hole, or bore 114, 214, 314, 414 (as shown in FIG. 1B, FIG. 2B, FIG. 3B, and FIG. 4B). In some embodiments, the second internal bore 114, 214, 314, 414 may extend from the back of the sinker body 110, 210, 310, 410 and axially toward the front of the sinker body 110, 210, 310, 410. In some embodiments, the second internal bore 114, 214, 314, 414 may only extend into the sinker body 110, 210, 310, 410 by an amount that is less than the length of the sinker body 110, 210, 310, 410. In some embodiments, the second internal bore 114, 214, 314, 414 may comprise a second diameter. According to some embodiments, such as depicted, the first internal bore 112, 212, 312, 412 may extend into the sinker body 110, 210, 310, 410 from the front of the sinker body 110, 210, 310, 410 and until it meets with the second internal bore 114, 214, 314, 414. In such a manner, for example, the sinker body 110, 210, 310, 410 may define an interior volume (not separately labeled) having a first area defined by the first bore diameter and a second area defined by the second bore diameter. According to some embodiments, the first and second bore diameters may be different. As depicted, for example, the second bore diameter of the second internal bore 114, 214, 314, 414 may be larger than the first bore diameter of the first internal bore 112, 212, 312, 412.

In some embodiments, the sinker body 110, 210, 310, 410 may comprise a channel or slit 116, 216, 316, 416. The slit 116, 216, 316, 416 may, for example, extend from one end of the sinker body 110, 210, 310, 410 to the other. According to some embodiments, the slit 116, 216, 316, 416 may extend from an outside surface of the sinker body 110, 210, 310, 410 inwardly (e.g., radially inward) to the first internal bore 112, 212, 312, 412 and/or the second internal bore 114, 214, 314, 414. In such a manner, for example, a fishing line (not shown) may be slipped through the slit 116, 216, 316, 416 and into the internal volume of the sinker body 110, 210, 310, 410 defined by the first internal bore 112, 212, 312, 412 and the second internal bore 114, 214, 314, 414.

According to some embodiments, the quick-attach sliding fishing weight 100, 200, 300, 400 may comprise a quick-attach shaft 120, 220, 320, 420. In some embodiments, the quick-attach shaft 120, 220, 320, 420 may be constructed of plastic and/or other semi-rigid or semi-pliable materials, rubber, and/or metal. The quick-attach shaft 120, 220, 320, 420 may, for example, be at least partially disposed in the internal volume of the sinker body 110, 210, 310, 410. As depicted, for example, the quick-attach shaft 120, 220, 320, 420 may be at least partially disposed in the second internal bore 114, 214, 314, 414 of the sinker body 110, 210, 310, 410. In some embodiments, the quick-attach shaft 120, 220, 320, 420 may comprise a shaft portion 124, 224, 324, 424 that is generally cylindrically shaped. In some embodiments, the shaft portion 124, 224, 324, 424 may comprise a first flange 124-1, 224-1, 324-1, 424-1 at a first or forward end and/or a second flange 124-2, 224-2, 324-2, 424-2 at a second or rear end thereof (e.g., as depicted in FIG. 1F, FIG. 2F, FIG. 3F, and FIG. 4F). According to some embodiments, the shaft portion 124, 224, 324, 424, the first flange 124-1, 224-1, 324-1, 424-1, and/or the second flange 124-2, 224-2, 324-2, 424-2 may be hollow. The quick-attach shaft 120, 220, 320, 420 may comprise a hole or bore (not separately labeled), for example, that extends axially from one end to the other (e.g., defining an interior passage thereof).

In some embodiments, the first flange 124-1, 224-1, 324-1, 424-1 may be inserted into the second internal bore 114, 214, 314, 414 up to a point where it encounters and/or engages with the, e.g., smaller, first internal bore 112, 212, 312, 412. The first flange 124-1, 224-1, 324-1, 424-1 may have a diameter that is smaller than the second bore diameter of the second internal bore 114, 214, 314, 414, for example, but that is larger than the first bore diameter of the first internal bore 112, 212, 312, 412. According to some embodiments, the second flange 124-2, 224-2, 324-2, 424-2 may, when the quick-attach shaft 120, 220, 320, 420 is inserted (e.g., fully) into the sinker body 110, 210, 310, 410, remain disposed outside of the sinker body 110, 210, 310, 410. As described herein, for example, the second flange 124-2, 224-2, 324-2, 424-2 may be engaged to selectively rotate the quick-attach shaft 120, 220, 320, 420 within the internal volume of the sinker body 110, 210, 310, 410 (e.g., with respect to the sinker body 110, 210, 310, 410), and the positioning of the second flange 124-2, 224-2, 324-2, 424-2 external to the internal volume of the sinker body 110, 210, 310, 410 may accordingly facilitate engagement thereof (e.g., by human fingers).

In some embodiments, the quick-attach shaft 120, 220, 320, 420 may comprise a channel or slit 126, 226, 326, 426. The slit 126, 226, 326, 426 may, for example, extend from one end of the quick-attach shaft 120, 220, 320, 420 to the other. According to some embodiments, the slit 126, 226, 326, 426 may extend from an outside surface of the quick-attach shaft 120, 220, 320, 420 inwardly (e.g., radially inward) to the interior passage thereof. In such a manner, for example, a fishing line (not shown) may be slipped through the slit 126, 226, 326, 426 and into the interior passage of the quick-attach shaft 120, 220, 320, 420.

According to some embodiments, the second flange 124-2, 224-2, 324-2, 424-2 may engage with the back of the sinker body 110, 210, 310, 410 in the case that the quick-attach shaft 120, 220, 320, 420 is inserted (e.g., fully) into the sinker body 110, 210, 310, 410. The second flange 124-2, 224-2, 324-2, 424-2 may, for example, comprise a diameter that is greater than the second bore diameter of the second internal bore 114, 214, 314, 414. In some embodiments, the depth or extent of the second internal bore 114, 214, 314, 414 may be equal to the length of the portion of the quick-attach shaft 120, 220, 320, 420 that comprises the first flange 124-1, 224-1, 324-1, 424-1 and the shaft portion 124, 224, 324, 424 (e.g., such that the second flange 124-2, 224-2, 324-2, 424-2 remains external to the internal volume in the case that the quick-attach shaft 120, 220, 320, 420 is fully inserted into the internal volume).

In some embodiments, the quick-attach sliding fishing weight 100, 200, 300, 400 may comprise a quick-attach collar 130, 230, 330, 430. According to some embodiments, the quick-attach collar 130, 230, 330, 430 may be constructed of plastic and/or other semi-rigid or semi-pliable materials, rubber, and/or metal. The quick-attach collar 130, 230, 330, 430 may, for example, comprise a cylindrical component inserted into the internal volume of the sinker body 110, 210, 310, 410. According to some embodiments, the quick-attach collar 130, 230, 330, 430 may be inserted into the second internal bore 114, 214, 314, 414 up to a point where it encounters and/or engages with the, e.g., smaller, first internal bore 112, 212, 312, 412. The quick-attach collar 130, 230, 330, 430 may have a diameter that is smaller than the second bore diameter of the second internal bore 114, 214, 314, 414, for example, but that is larger than the first bore diameter of the first internal bore 112, 212, 312, 412. In some embodiments, the quick-attach collar 130, 230, 330, 430 may comprise a hollow cylinder defining a collared-passage into which the quick-attach shaft 120, 220, 320, 420 is disposed. As described herein, for example, the quick-attach shaft 120, 220, 320, 420 may be selectively rotated within the quick-attach collar 130, 230, 330, 430 to engage or disengage with a fishing line.

According to some embodiments, the quick-attach sliding fishing weight 100, 200, 300, 400 may comprise a slotted pin 140, 240, 340, 440. In some embodiments, the slotted pin 140, 240, 340, 440 may be constructed of metal, plastic, or rubber. The slotted pin 140, 240, 340, 440 may, for example, comprise a cylindrical component inserted into the internal volume of the sinker body 110, 210, 310, 410, the collared-passage of the quick-attach collar 130, 230, 330, 430, and/or the interior passage of the quick-attach shaft 120, 220, 320, 420. According to some embodiments, the slotted pin 140, 240, 340, 440 may be inserted into the first internal bore 112, 212, 312, 412 and extend through the interior passage of the quick-attach shaft 120, 220, 320, 420 (which itself may be disposed within and or inserted into the collared-passage of the quick-attach collar 130, 230, 330, 430, which may be disposed in the second internal bore 114, 214, 314, 414). In some embodiments, the slotted pin 140, 240, 340, 440 may be hollow and/or otherwise define an internal channel 142, 242, 342, 442. According to some embodiments, the slotted pin 140, 240, 340, 440 may comprise a slit or slot 146, 246, 346, 446. As depicted, for example, the slotted pin 140, 240, 340, 440 may comprise an elongated hollow cylinder with the slot 146, 246, 346, 446 extending from one end to the other. In such a manner, for example, a fishing line (not shown) may be slipped through the slot 146, 246, 346, 446 and into the internal channel 142, 242, 342, 442.

In some embodiments, any or all of the components 110, 210, 310, 410, 112, 212, 312, 412, 114, 214, 314, 414, 116, 216, 316, 416, 120, 220, 320, 420, 124, 224, 324, 424, 124-1, 224-1, 324-1, 424-1, 124-2, 224-2, 324-2, 424-2, 126, 226, 326, 426, 130, 230, 330, 430, 140, 240, 340, 440, 142, 242, 342, 442, 146, 246, 346, 446 of the quick-attach sliding fishing weight 100, 200, 300, 400 may be similar in configuration and/or functionality to any similarly named and/or numbered components described herein. Fewer or more components 110, 210, 310, 410, 112, 212, 312, 412, 114, 214, 314, 414, 116, 216, 316, 416, 120, 220, 320, 420, 124, 224, 324, 424, 124-1, 224-1, 324-1, 424-1, 124-2, 224-2, 324-2, 424-2, 126, 226, 326, 426, 130, 230, 330, 430, 140, 240, 340, 440, 142, 242, 342, 442, 146, 246, 346, 446 (and/or portions thereof) and/or various configurations of the components 110, 210, 310, 410, 112, 212, 312, 412, 114, 214, 314, 414, 116, 216, 316, 416, 120, 220, 320, 420, 124, 224, 324, 424, 124-1, 224-1, 324-1, 424-1, 124-2, 224-2, 324-2, 424-2, 126, 226, 326, 426, 130, 230, 330, 430, 140, 240, 340, 440, 142, 242, 342, 442, 146, 246, 346, 446 may be included in the quick-attach sliding fishing weight 100, 200, 300, 400 without deviating from the scope of embodiments described herein. In some embodiments, one or more of the various components 110, 210, 310, 410, 112, 212, 312, 412, 114, 214, 314, 414, 116, 216, 316, 416, 120, 220, 320, 420, 124, 224, 324, 424, 124-1, 224-1, 324-1, 424-1, 124-2, 224-2, 324-2, 424-2, 126, 226, 326, 426, 130, 230, 330, 430, 140, 240, 340, 440, 142, 242, 342, 442, 146, 246, 346, 446 may not be needed and/or desired in the quick-attach sliding fishing weight 100, 200, 300, 400.

III. Quick-Attach Components

Figure 5A:
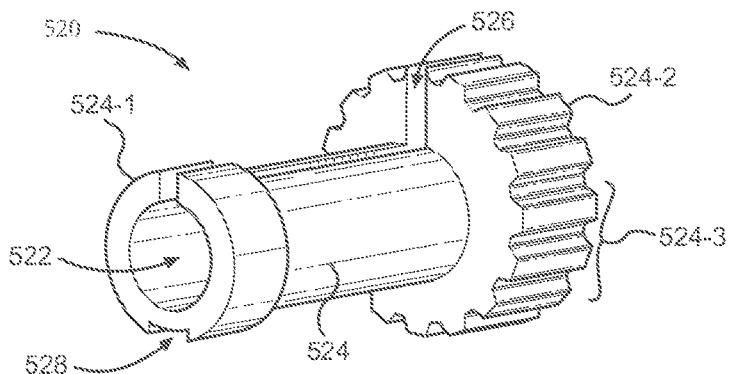
FIG. 5A, FIG. 5B, FIG. 5C, FIG. 5D, FIG. 5E, FIG. 5F, and FIG. 5G are perspective, front, back, left side, right side, top, and bottom views of a quick-attach shaft according to some embodiments.
Figure 5B:
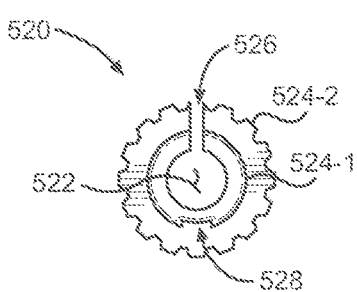
Figure 5C:
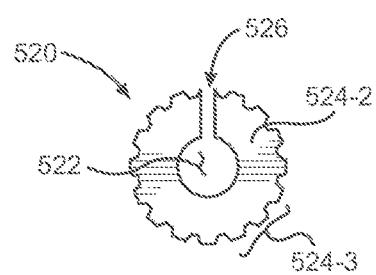
Figure 5D:
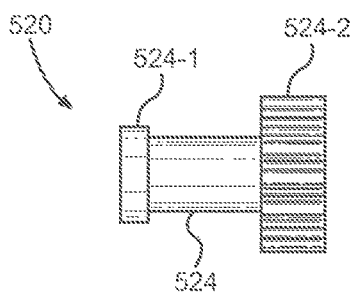
Figure 5E:
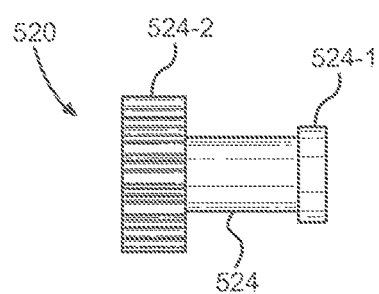
Figure 5F:
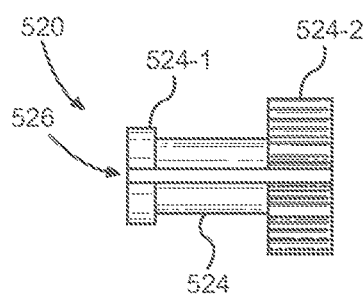
Figure 5G:
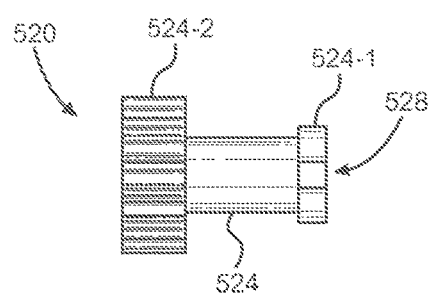

Referring now to FIG. 5A, FIG. 5B, FIG. 5C, FIG. 5D, FIG. 5E, FIG. 5F, and FIG. 5G, perspective, front, back, left side, right side, top, and bottom views of a quick-attach shaft 520 according to some embodiments are shown. In some embodiments, the quick-attach shaft 520 may general comprise a hollow shaft defining an internal volume 522. The quick-attach shaft 520 may comprise, for example, a cylindrical portion 524 having a first flanged portion 524-1 at a first end and/or a second flanged portion 524-2 at a second end. The cylindrical portion 524 may, in some embodiments, have a first outside diameter, the first flanged portion 524-1 may have a second outside diameter, and/or the second flanged portion 524-2 may have a third outside diameter. As depicted, the third outside diameter of the second flanged portion 524-2 may be the largest of the three diameters and/or the first outside diameter of the cylindrical portion 524 may be the smallest of the three diameters.

According to some embodiments, the circumference of the second flanged portion 524-2 may comprise a plurality of projections 524-3. The projections 542-3 may, for example, provide a better gripping surface for a human to engage with and manually turn the quick-attach shaft 520 in accordance with embodiments herein. In some embodiments, the projections 542-3 may comprise uniformly spaced (e.g., about the circumference of the second flanged portion 524-2) radially extending portions. According to some embodiments, the projections 542-3 may comprise and/or be defined by grooves, ribs, and/or other features on the exterior surface of the second flanged portion 524-2, such as diamond knurl, waffling, etc.

In some embodiments, the quick-attach shaft 520 may comprise an axial slot 526. The axial slot 526 may, for example, comprise a cut or channel that extends inwardly from an outside surface of the quick-attach shaft 520 to the internal volume 522 thereof. In such a manner, for example, a fishing line (not shown) may be slipped through the axial slot 526 and into the internal volume 522.

According to some embodiments, the quick-attach shaft 520 may comprise an indexing feature 528. The indexing feature 528 may, as depicted for example, be disposed on an exterior surface of the first flanged portion 524-1. In some embodiments, the indexing feature 528 may comprise an indent, channel, groove, dimple, and/or other interruption in the exterior surface of the first flanged portion 524-1 (and/or other exterior portion of the quick-attach shaft 520). According to some embodiments, the indexing feature 528 may be operable to engage with a cooperating indexing element on an inside surface of a quick-attach collar or sinker body (neither shown in FIG. 5). In such a manner, for example, rotation of the quick-attach shaft 520 within a surrounding or nesting element may cause the indexing feature 528 to become engaged with the nesting element, thereby initiating a force that opposes further rotation. In the case that the quick-attach shaft 520 and/or the nesting element are pliable, particularly in a radial direction (e.g., due to the axial slot 526 and/or a similar slot of the nesting element), the opposing force may be overcome by applying additional rotational force to the quick-attach shaft 520. While a single indexing feature 528 is depicted, multiple indexing features 528 may be employed in some embodiments, such as to allow selective indexing of the quick-attach shaft 520 with respect to a nesting element to occur at multiple relative angles.

In some embodiments, any or all of the components 522, 524, 524-1, 524-2, 524-3, 526, 528 of the quick-attach shaft 520 may be similar in configuration and/or functionality to any similarly named and/or numbered components described herein. Fewer or more components 522, 524, 524-1, 524-2, 524-3, 526, 528 (and/or portions thereof) and/or various configurations of the components 522, 524, 524-1, 524-2, 524-3, 526, 528 may be included in the quick-attach shaft 520 without deviating from the scope of embodiments described herein. In some embodiments, one or more of the various components 522, 524, 524-1, 524-2, 524-3, 526, 528 may not be needed and/or desired in the quick-attach shaft 520.

Figure 6A:
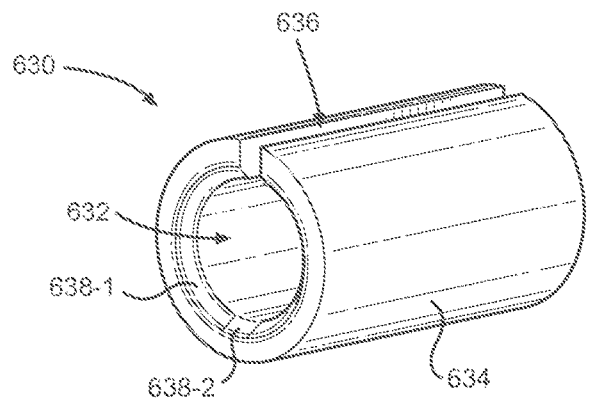
FIG. 6A, FIG. 6B, FIG. 6C, FIG. 6D, FIG. 6E, FIG. 6F, and FIG. 6G are perspective, front, back, left side, right side, top, and bottom views of a quick-attach collar according to some embodiments.
Figure 6B:
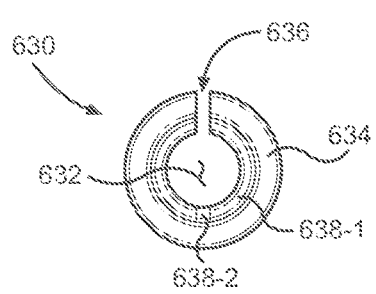
Figure 6C:
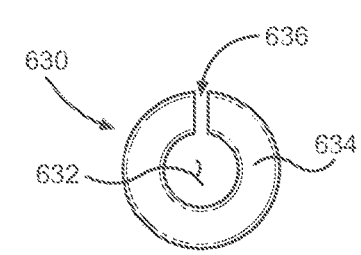
Figure 6D:
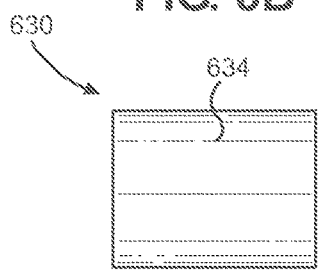
Figure 6E:
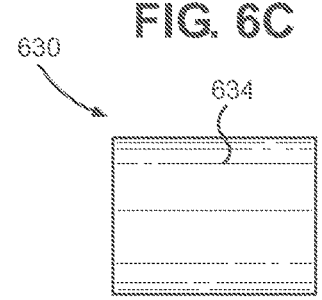
Figure 6F:
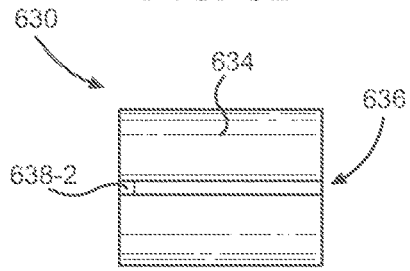
Figure 6G:
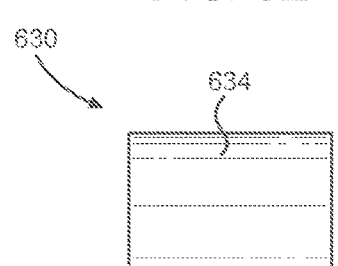

Turning to FIG. 6A, FIG. 6B, FIG. 6C, FIG. 6D, FIG. 6E, FIG. 6F, and FIG. 6G, perspective, front, back, left side, right side, top, and bottom views of a quick-attach collar 630 according to some embodiments are shown. In some embodiments, the quick-attach collar 630 may general comprise a hollow cylinder defining an internal volume 632. The quick-attach collar 630 may comprise, for example, a cylindrical body portion 634 having an axial slot 636. The axial slot 636 may, for example, comprise a cut or channel that extends inwardly from an outside surface of the cylindrical body portion 634 to the internal volume 632 thereof. In such a manner, for example, a fishing line (not shown) may be slipped through the axial slot 636 and into the internal volume 632.

According to some embodiments, the quick-attach collar 630 may comprise an indexing channel 638-1 and/or an indexing element 638-2. The indexing channel 638-1 may, in some embodiments, comprise a portion of an interior surface of the cylindrical body portion 634 that comprises an interior diameter that is larger than the interior diameter of the remainder of the interior surface. The indexing channel 638-1 may comprise, for example, a groove disposed on the interior surface at a first end of the cylindrical body portion 634. In such a manner, for example, a nested element (e.g., the quick-attach shaft 520 and/or a portion thereof) may fit within the internal volume 632 and a portion of the nested element (e.g., a projection therefrom; such as the first flanged portion 524-1) having a larger diameter than the main portion of the nested element may fit, rest within, and/or be retained by the indexing channel 638-1.

In some embodiments, the indexing element 638-2 may comprise a tab, ridge, protrusion, rib, and/or other feature that is disposed in and/or interrupts the indexing channel 638-1. The indexing element 638-2 may, for example, be selectively mated with a corresponding indexing feature of a nested element (not shown; such as the indexing feature 528 of the quick-attach shaft 520). A corresponding indexing feature such as an indent, channel, groove, and/or dimple may, for example, accept, mate with, and/or seat the indexing element 638-2 in the case that the indexing element 638-2 and the corresponding indexing feature are radially aligned. According to some embodiments, the indexing element 638-2 may be operable to engage with a cooperating indexing element on an outside surface of a quick-attach shaft (neither shown in FIG. 6). In such a manner, for example, rotation of the nested shaft within the internal volume 632 may cause the indexing element 638-2 to become engaged with the nested element, thereby initiating a force that opposes further rotation. In the case that the nested shaft and/or the cylindrical body portion 634 are pliable, particularly in a radial direction (e.g., due to the axial slot 636 and/or a similar slot of the nested element), the opposing force may be overcome by applying additional rotational force to the cylindrical body portion 634. While a single indexing element 638-2 is depicted, multiple indexing element 638-2 may be employed in some embodiments, such as to allow selective indexing of the cylindrical body portion 634 with respect to a nested element to occur at multiple relative angles. In some embodiments, as depicted the indexing element 638-2 may be disposed and/or formed on the inside surface of the cylindrical body portion 634 opposite from the axial slot 636.

In some embodiments, any or all of the components 632, 634, 636, 638-1, 638-2 of the quick-attach collar 630 may be similar in configuration and/or functionality to any similarly named and/or numbered components described herein. Fewer or more components 632, 634, 636, 638-1, 638-2 (and/or portions thereof) and/or various configurations of the components 632, 634, 636, 638-1, 638-2 may be included in the quick-attach collar 630 without deviating from the scope of embodiments described herein. In some embodiments, one or more of the various components 632, 634, 636, 638-1, 638-2 may not be needed and/or desired in the quick-attach collar 630.

IV. Quick-Attach Sliding Fishing Weight Systems

Turning to FIG. 7, a perspective assembly diagram of a quick-attach sliding fishing weight system 700 according to some embodiments is shown. The quick-attach sliding fishing weight system 700 may comprise, for example, a sinker 710 comprising a first bore 712 having a first diameter and a second bore 714 having a second diameter. In some embodiment, the second diameter of the second bore 714 may be larger than the first diameter of the first bore 712. According to some embodiments, the sinker 710 may comprise an axial slot 716. The axial slot 716 may, for example, open and/or expose the first bore 712 and the second bore 714 to be in communication with an area surrounding the sinker 710.

In some embodiments, the quick-attach sliding fishing weight system 700 may comprise a shaft element 720 defining an interior passage 722. According to some embodiments, the shaft element 720 may comprise a cylindrical body 724 having a first flaring or flange 724-1 and/or a second flaring, knob, or flange 724-2. In some embodiments, the shaft element 720 may comprise an axial slot 726. The axial slot 726 may, for example, open and/or expose the interior passage 722 to be in communication with an area surrounding the shaft element 720. In some embodiments, the shaft element 720 may comprise an indexing feature 728 such as a detent disposed on an exterior surface of the first flange 724-1.

According to some embodiments, the quick-attach sliding fishing weight system 700 may comprise a collar element 730. The collar element 730 may be hollow and/or define an internal volume 732 within a cylindrical body 734. In some embodiments, the collar element 730 may comprise an axial slot 736. The axial slot 736 may, for example, open and/or expose the internal volume 732 to be in communication with an area surrounding the collar element 730. In some embodiments, the collar element 730 may comprise an indexing channel 738-1 and/or an indexing element 738-2. The indexing channel 738-1 may comprise a groove or channel in the surface of the internal volume 732, for example, and/or the indexing element 738-2 may comprise a raised portion of the indexing channel 738-1, a nub, pin, rib, post, and/or other protrusion or interruption to the indexing channel 738-1.

In some embodiments, the quick-attach sliding fishing weight system 700 may comprise a pin element 740. The pin element 740 may be hollow and/or define an internal channel 742. In some embodiments, the pin element 740 may comprise an axial slot 746. The axial slot 746 may, for example, open and/or expose the internal channel 742 to be in communication with an area surrounding the pin element 740.

According to some embodiments, the shaft element 720 may be inserted into or nested within the collar element 730 and/or the pin element 740 may be inserted into or nested within the shaft element 720. In some embodiments, the combined and/or nested pin element 740, shaft element 720, and collar element 730 may be inserted into and/or coupled within the sinker 710. According to some embodiments, the collar element 730 may be securely coupled (e.g., glued) within the second bore 714, for example, and the shaft element 720 and the pin element 740 may be rotatably coupled within the collar element 730. In some embodiments, the pin element 740 may be securely coupled to within the shaft element 720 such that, for example, any rotation of the shaft element 720 is imparted to the pin element 740 (e.g., they may rotate together). In some embodiments, the pin element 740 may be integrated with and/or part of the shaft element 720 (not shown). According to some embodiments, the collar element 730 may not be included in the quick-attach sliding fishing weight system 700. The indexing channel 738-1 and/or the indexing element 738-2 of the collar element 730 may, for example, be integrated with and/or part of the inside of the sinker 710.

In some embodiments, beads, balls, pellets, and/or other small and/or granular (e.g., pebbles, chips, gravel, etc.) materials (none of which are explicitly shown) may incorporated into the quick-attach sliding fishing weight system 700. Such materials may be housed, for example, within one or more chambers (not shown) formed inside of any or all of the shaft element 720, the collar element 730, the pin element 740, and/or the sinker 710. In such a manner, for example, action of the quick-attach sliding fishing weight system 700 may cause the materials to generate sound that may be attractive to fish. According to some embodiments, sliding space (not shown) may be allowed between the shaft element 720, the collar element 730, the pin element 740, and/or the sinker 710 such that action of the quick-attach sliding fishing weight system 700 causes one or more of such components to engage with one or more of the other components to generate sound. In some embodiments, the pin element 740 may extend from within (e.g., in front of) the sinker 710 (as shown) and may, in the case that the quick-attach sliding fishing weight system 700 slides down a fishing line (not shown) and engages a connected tackle element such as a lure, bead, or swivel (not shown), be forced back into the sinker 710 to engage with another component and generate sound. In some embodiments, the pin element 740 may be axially biased, e.g., utilizing a spring element (not shown), such that an axial engagement force may generate the attracting sound with the spring element then forcing the pin element 740 back to a pre-engagement position once the force and/or impact has dissipated. According to some embodiments, the pin element 740 may not extend outside of the sinker 110.

According to some embodiments, any or all of the components 710, 712, 714, 716, 720, 722, 724, 724-1, 724-2, 726, 728, 730, 732, 734, 736, 738-1, 738-2, 740, 742, 746 of the quick-attach sliding fishing weight system 700 may be similar in configuration and/or functionality to any similarly named and/or numbered components described herein. Fewer or more components 710, 712, 714, 716, 720, 722, 724, 724-1, 724-2, 726, 728, 730, 732, 734, 736, 738-1, 738-2, 740, 742, 746 (and/or portions thereof) and/or various configurations of the components 710, 712, 714, 716, 720, 722, 724, 724-1, 724-2, 726, 728, 730, 732, 734, 736, 738-1, 738-2, 740, 742, 746 may be included in the quick-attach sliding fishing weight system 700 without deviating from the scope of embodiments described herein. In some embodiments, one or more of the various components 710, 712, 714, 716, 720, 722, 724, 724-1, 724-2, 726, 728, 730, 732, 734, 736, 738-1, 738-2, 740, 742, 746 may not be needed and/or desired in the quick-attach sliding fishing weight system 700.

Referring now to FIG. 8A and FIG. 8B, rear views of a quick-attach sliding fishing weight system 800 according to some embodiments are shown. The quick-attach sliding fishing weight system 800 may comprise, for example, a hollow sinker 810 having a first axial groove 816 (e.g., extending into the page), a shaft element 820 having a second axial groove 826 (e.g., extending into the page), and/or a pin element 840 having a third axial groove 846 (e.g., extending into the page). As depicted in FIG. 8A, in the case that all three axial grooves 816, 826, 846 are aligned, a fishing line 850 (shown in cross-section, and extending into and out of the page) may be inserted into the interior of the quick-attach sliding fishing weight system 800. As depicted in FIG. 8B, in the case that the pin element 740 and the shaft element 720 are rotated to form an angle of offset 852 between the second and third axial grooves 826, 846 and the first axial groove 816, the fishing line 850 may be securely (but slidably) retained within the quick-attach sliding fishing weight system 800. In such a manner, for example, the quick-attach sliding fishing weight system 800 may be quickly and easily attached or detached from the fishing line 850 simply by rotationally engaging the shaft element 820 and/or the pin element 840. In some embodiments, such as in the case that the pin element 840 is integral to and/or part of the shaft element 820, only the shaft element 820 may need to be rotated (with respect to the sinker 810) to selectively allow or prevent the fishing line 850 from being engaged or disengaged with the quick-attach sliding fishing weight system 800.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant currently intends to file additional applications to pursue patents for subject matter that has been disclosed and enabled but not claimed in the present application.

What is claimed is:

1. A quick-attach sliding fishing weight, comprising:
   a sinker body comprising a first axial slit and an interior bore;
   a hollow collar disposed within the axial bore and comprising (i) a second axial slit and (ii) an indexing element disposed within an internal volume of the hollow collar; and
   a hollow shaft element disposed within the hollow collar and comprising (i) a third axial slit and (ii) an indexing feature disposed on an exterior surface of the hollow shaft element.

2. The quick-attach sliding fishing weight of claim 1, further comprising:
   a slotted pin element disposed within the hollow shaft element and comprising a fourth axial slit.

3. The quick-attach sliding fishing weight of claim 1, wherein the indexing element disposed within the internal volume of the hollow collar comprises two indexing elements, each indexing element projecting radially inward from an interior surface of the hollow collar, and the two indexing elements being radially separated about the circumference of the interior surface by an indexing element spacing distance.

4. The quick-attach sliding fishing weight of claim 3, wherein the indexing feature disposed on the exterior surface of the hollow shaft element comprises two indexing features, each indexing feature projecting radially outward from an exterior surface of the hollow shaft element, and the two indexing features being radially separated about the circumference of the exterior surface by an indexing feature spacing distance.

5. The quick-attach sliding fishing weight of claim 4, wherein an alignment of a first one of the indexing elements with a first one of the indexing features causes a selective alignment of the third axial slit with each of the first and second axial slits, and wherein an alignment of a second one of the indexing elements with a second one of the indexing features causes a selective alignment of the third axial slit with an interior surface of at least one of the interior bore and the interior volume.

6. A quick-attach sliding fishing weight, comprising:
   a sinker body comprising a first axial slit, a first interior bore extending axially inward from a front end of the sinker body, and a second interior bore extending axially inward from a back end of the sinker body, the first axial bore being smaller than the second axial bore, and an indexing element disposed on an interior surface of one of the first and second axial bores; and
   a hollow shaft element comprising a first portion disposed within the first axial bore of the sinker body and a second portion disposed within the second axial bore of the sinker body, the hollow shaft element comprising a second axial slit and an indexing feature disposed on an exterior surface of the hollow shaft element.

7. The quick-attach sliding fishing weight of claim 6, wherein alignment of the indexing element with the indexing feature causes a selective alignment of the first and second axial slits.

8. The quick-attach sliding fishing weight of claim 6, wherein alignment of the indexing element with the indexing feature causes a selective misalignment of the first and second axial slits.

\* \* \* \* \*